US011292856B2

(12) United States Patent
Pasatta

(10) Patent No.: US 11,292,856 B2
(45) Date of Patent: Apr. 5, 2022

(54) UREA TERMINATED BUTADIENE POLYMERS AND BUTADIENE ACRYLONITRILE COPOLYMERS

(71) Applicant: Huntsman Advanced Materials Americas LLC, The Woodlands, TX (US)

(72) Inventor: Jeremy Pasatta, Olmsted Falls, OH (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 0 days.

(21) Appl. No.: 16/632,139

(22) PCT Filed: Jul. 20, 2018

(86) PCT No.: PCT/US2018/043066
§ 371 (c)(1),
(2) Date: Jan. 17, 2020

(87) PCT Pub. No.: WO2019/018753
PCT Pub. Date: Jan. 24, 2019

(65) Prior Publication Data
US 2020/0231721 A1    Jul. 23, 2020

Related U.S. Application Data

(60) Provisional application No. 62/535,542, filed on Jul. 21, 2017.

(51) Int. Cl.
| | |
|---|---|
| *C08F 36/06* | (2006.01) |
| *C08G 18/08* | (2006.01) |
| *C08G 81/02* | (2006.01) |
| *C08L 63/00* | (2006.01) |
| *C08F 136/06* | (2006.01) |
| *C08G 18/69* | (2006.01) |
| *C08L 9/02* | (2006.01) |
| *C08L 9/00* | (2006.01) |

(52) U.S. Cl.
CPC ............ *C08F 36/06* (2013.01); *C08F 136/06* (2013.01); *C08G 18/08* (2013.01); *C08G 18/69* (2013.01); *C08G 18/692* (2013.01); *C08G 81/024* (2013.01); *C08L 9/00* (2013.01); *C08L 9/02* (2013.01); *C08L 63/00* (2013.01)

(58) Field of Classification Search
CPC .... C08G 18/69; C08G 18/692; C08G 18/833; C08G 59/686; C08L 9/00; C08L 9/02; C08L 63/00–10; C09D 109/00; C09D 109/02; C09D 163/00–10; C09J 109/00; C09J 109/02; C09J 163/00–10; C08J 2409/00; C08J 2409/02; C08F 36/06; C08F 136/06; C08F 236/06; C08F 2810/40

See application file for complete search history.

(56) References Cited

U.S. PATENT DOCUMENTS

| | | | |
|---|---|---|---|
| 3,294,749 A | 12/1966 | Pratt | |
| 3,386,956 A | 6/1968 | Chrobok et al. | |
| 3,427,366 A | 2/1969 | Verdol et al. | |
| 3,714,110 A | 1/1973 | Verdol et al. | |
| 3,855,379 A * | 12/1974 | Araki | C08G 18/81 528/69 |
| 3,945,971 A | 3/1976 | Harrison et al. | |
| 4,295,909 A * | 10/1981 | Baccei | C09K 3/10 156/307.3 |
| 4,931,529 A | 6/1990 | Burba et al. | |
| 6,231,959 B1 | 5/2001 | Nakamura et al. | |
| 7,750,107 B2 | 7/2010 | Antelmann et al. | |
| 8,404,787 B2 | 3/2013 | Lutz et al. | |
| 2004/0127674 A1* | 7/2004 | Haubennestel | C08G 18/69 528/61 |
| 2006/0276601 A1 | 12/2006 | Lutz et al. | |
| 2007/0093595 A1 | 4/2007 | Griswold et al. | |
| 2010/0151240 A1 | 6/2010 | Griswold et al. | |
| 2011/0065958 A1 | 3/2011 | Abdourazak et al. | |

FOREIGN PATENT DOCUMENTS

| | | |
|---|---|---|
| JP | 52020518 B | 6/1977 |
| JP | 2004099896 A | 4/2004 |
| JP | 2009512758 A | 3/2009 |
| JP | 2013040338 A | 2/2013 |
| WO | 2007050355 A | 5/2007 |
| WO | 2017044402 A1 | 3/2017 |

OTHER PUBLICATIONS

Tian, X., et al. Studies on the properties of a thermosetting epoxy modified with chain-extended ureas containing hydroxyl-terminated polybutadiene, Polymer Testing, 2011, vol. 30, pp. 16-22, Elsevier Ltd.

He, S., et al., Studies on the properties of epoxy resins modified with chain-extended ureas, Polymer, 2001, vol. 42, pp. 9641-9647, Elsevier Science Ltd.

* cited by examiner

*Primary Examiner* — Kregg T Brooks
(74) *Attorney, Agent, or Firm* — Huntsman Advanced Materials Americas LLC; Robert Diaz

(57) ABSTRACT

Urea-terminated polybutadiene polymers and polybutadiene acrylonitrile copolymers useful as both accelerators and tougheners are disclosed for use in epoxy formulations cured with dicyandiamide. The inventive urea-terminated polymers achieve comparable toughness in cured epoxy formulations when compared to that achieved with traditional polymeric or rubber tougheners with little to no change in glass transition temperature. Viscosity improvement and stability over time are also an advantage. A method of preparation emphasizing aspects of reaction stoichiometry is also disclosed.

7 Claims, No Drawings

UREA TERMINATED BUTADIENE POLYMERS AND BUTADIENE ACRYLONITRILE COPOLYMERS

FIELD OF THE INVENTION

This invention is directed to the production of urea-terminated butadiene (UTB) and urea-terminated butadiene acrylonitrile (UTBN) copolymers, having novel, unexpected properties. The inventive polymers act as both accelerators and tougheners for latent heat cured epoxy formulations, eliminating the need to utilize traditional urea accelerators or separate accelerators and tougheners. Unexpectedly, when used at certain concentrations, the polymers have no to minimal effect on the glass transition temperature of the formulation. In addition, the latency of epoxy formulations containing the inventive polymers is comparable to epoxy formulations comprising other commercially available ureas used as accelerators. Epoxy formulations containing the urea-terminated polymers of the invention have a lower viscosity compared to formulations containing traditional tougheners.

BACKGROUND OF THE INVENTION

Substituted ureas have long been used to accelerate the curing reaction of epoxy resins along with various other curatives. One of the earliest references to the synthesis and use of N-substituted ureas is U.S. Pat. No. 3,294,749, which discloses the formation of an N-substituted urea through the reaction of an isocyanate with a primary or secondary amine, which is then used to catalyze the curing reaction between an epoxy and anhydride. Bis-ureas, based on various substituted phenylenes, were used as accelerators for epoxy resin cured with dicyandiamide in U.S. Pat. No. 3,386,956, Other patents which detail urea synthesis and their use as accelerators in epoxy compositions include but are not limited to U.S. Pat. Nos. 3,945,971; 4,931,529; 6,231,959 and 7,750,107.

The urea accelerators described in the above cited patents are not polymeric ureas. A polymeric urea offers the potential, additional advantage of improving properties of the cured epoxy, such as toughness. Traditional toughening methods include, for example, the use of carboxyl terminated polybutadiene acrylonitrile copolymers and their adducts with epoxy resins, among others.

Polymeric urea accelerators are known in the art. For example, U.S. Patent Publ. No. 2011/0065958 details the synthesis of polymeric urea accelerators by reacting a polyalkylenepolyamine with an isocyanate, and then using the reaction products to accelerate epoxy resin cured with dicyandiamide. The publication makes no mention of improving other properties of the epoxy resin, such as toughness; and the urea compounds formed by the process are considered very low molecular weight compared to polymers typically used as toughening agents in thermosets.

Literature studies have examined the use of polymeric urea accelerators to accelerate the curing reaction between epoxy resin and dicyandiamide and to improve properties such as toughness. In a 2001 study published in Polymer (Polymer 42 (2001) 9641-9647), polypropylene glycol was reacted with toluene diisocyanate and then further reacted with dimethylamine or imidazole to form polymeric ureas terminated with either dimethylamine or imidazole. Both terminations were found to accelerate the epoxy curing. The dimethylamine-terminated urea gave significant increases in impact strength, but with significant lowering of the glass transition temperature of the cured formulation. This is a disadvantage for cured formulations that are formulated to operate at high temperatures and must maintain a high glass transition temperature. The imidazole-terminated urea provided only moderate improvements in impact strength but maintained the glass transition temperature of the cured epoxy resin. Thus, neither of the polymeric ureas in the study provided both significant improvements in toughness while at the same time maintaining glass transition temperature of the cured epoxy matrix.

More recently, in a 2011 study published in Polymer Testing (Polymer Testing 30 (2011) 16-22), hydroxyl terminated polybutadienes of various molecular weights were reacted with toluene diisocyanate, the reaction product of which was further reacted with dimethylamine to produce a urea terminated polybutadiene. The urea terminated polybutadiene was shown to accelerate the curing reaction between an epoxy resin and dicyandiamide and moderately improve the toughness of the epoxy, but, disadvantageously, at very large reduction in the glass transition temperature of the cured epoxy matrix. Urea terminated polybutadiene also has the known disadvantage in that polybutadiene is incompatible with most epoxy resins and will not generate the proper phase separated morphology to achieve optimal improvements in toughness.

There remains a need, therefore, for urea-terminated polymers that act as accelerators and result in improved toughening of epoxy formulations, while having little to no impact on the glass transition temperature of the cured epoxy adhesive. Furthermore, the urea-terminated polymer should have little to no impact on formulated epoxy viscosity and should maintain viscosity stability of the formulated epoxies during storage.

Surprisingly, it has been found that urea-terminated butadiene polymers and butadiene acrylonitrile copolymers, when prepared under the conditions described herein and used at a certain concentration in an epoxy resin cured with dicyandiamide, provide good reaction acceleration, significant increases in toughness as evaluated by T-Peel tests, very little or no reduction in the glass transition temperature, good viscosity stability and less impact on formulated epoxy viscosity, which has not been previously achieved in the art. Unexpectedly, the performance of the inventive urea-terminated polybutadienes is vastly improved by increasing the stoichiometry of the urea termination reaction. These unexpected results are achieved with a variety of starting materials provided that the conditions described herein are met.

It is an object of the invention to provide urea-terminated butadiene polymers and butadiene acrylonitrile copolymers that function both as accelerators and tougheners in epoxy formulations while having little to no effect on the glass transition temperature of the epoxy.

It is another object of the invention to provide a process for preparing urea-terminated butadiene polymers and butadiene acrylonitrile copolymers that function both as accelerators and tougheners in epoxy formulations with little to no effect of the glass transition temperature of the epoxy.

Still another object of the invention is to provide epoxy formulations comprising the urea-terminated butadiene polymers and butadiene acrylonitrile copolymers of the invention.

Other objects of the invention will be recognized by one skilled in the art.

SUMMARY OF THE INVENTION

The invention is directed to urea-terminated butadiene polymers and butadiene acrylonitrile copolymers and their use in latent heat cured epoxy systems, which function, unexpectedly, as accelerators and tougheners, with little to no effect on glass transition temperature of the epoxy. The invention is also directed to methods of preparing the urea-terminated butadiene polymers and butadiene copolymers of the invention.

In one embodiment, the invention is a urea-terminated polybutadiene or polybutadiene acrylonitrile copolymer, made by first reacting a hydroxyl terminated polybutadiene, hydroxyl terminated polybutadiene acrylonitrile copolymer, carboxyl terminated polybutadiene, carboxyl terminated polybutadiene acrylonitrile copolymer, amine terminated polybutadiene, or amine terminated polybutadiene acrylonitrile copolymer with toluene diisocyanate, the reaction products of which are then reacted with dimethylamine to form the urea-terminated polymers. While this general method for production of urea-terminated polymers is known, the invention is not limited to this particular method. The urea-terminated polymers of the invention may be prepared using other isocyanates and amines or imidazoles commonly known to those in the art according to the method disclosed herein.

In another embodiment, the invention is a latent heat cured epoxy containing dicyandiamide, in which the urea-terminated polymers of the invention act both as a tougheners and accelerators. The latent heat cured epoxy containing the urea-terminated polymers of the present invention can be used in a variety of applications, including but not limited to, adhesives, prepregs, foamable epoxies and the like. Other uses will be evident to one skilled in the art.

In yet another embodiment, the invention is a method for preparing urea-terminated polymers of the invention using select stoichiometry of reactants.

Significantly, the urea-terminated polymers of the invention have advantages over previously known substituted ureas and polymeric ureas as described above, in that they effectively accelerate and toughen dicyandiamide cured epoxies with minimal or no impact on the glass transition temperature. They also provide a lower formulated viscosity compared to traditional tougheners and have good storage stability that is maintained over time.

DETAILED DESCRIPTION OF THE INVENTION

The invention is directed to urea-terminated polymers that, unexpectedly, act as both tougheners and accelerators in latent heat cured epoxy containing dicyandiamide and applications for their use, while having little or no effect on glass transition temperature.

The following terms used in describing the invention have the definitions set forth below.

"Butadiene" or "butadiene polymer" means a polybutadiene. The terms "butadiene polymer(s)", "polybutadiene polymer(s)", and "polybutadiene" are used interchangeably herein.

"Butadiene acrylonitrile copolymer" means a copolymer comprising both butadiene and acrylonitrile monomer units. "Butadiene acrylonitrile copolymer(s)" and "polybutadiene acrylonitrile copolymer(s)" are used interchangeably herein.

"Isocyanate" as used herein refers to a functional group or an organic compound containing a functional group with the formula R—N=C=O (—NCO group), "Isocyanate" may be used interchangeably herein with "diisocyanate".

"Polymers", when used generally to describe the inventive urea-terminated compositions, includes "copolymers."

"Urea-terminated", when used with respect to the polybutadiene polymers and polybutadiene acrylonitrile copolymers of the invention, means and includes polymers or copolymers having urea groups at the terminal ends of the polymer or copolymer. The inventive polymer compositions do not require that the urea group be formed precisely at the end of the polymer chain: however, the inventive polymers do not include multiple urea linkages throughout the backbone of the polymer chain.

"Urea content" is defined as the total weight percentage of the urea reaction product of isocyanate and amine terminating agent, whether it is incorporated into the polymer or formed through the reaction of excess diisocyanate and amine terminating agent, i.e., free urea. Total urea content is important since the higher total urea content the faster the acceleration of the curing reaction of the epoxy. "Total urea content" and "urea content" are used interchangeably herein. "Free urea content" is used to designate urea compounds formed through the reaction of excess diisocyanate and amine terminating agent, but not incorporated into the polymers of the invention. Urea content of the inventive polymers ranges in some cases from about 1% to about 35%, in some case from about 5% to about 33%, and still in other cases from about 10% to 30%, by weight, which includes urea content bound to the polymer chain and free urea content formed through the reaction of excess diisocyanate and amine and not bound to the polymer.

"Stoichiometry" means the relationship between the relative quantities of substances or components taking part in a reaction or forming a compound, frequently, but not limited to, a ratio of whole integers. For purposes of the invention, "stoichiometry" means the relationship, in the initial reaction step, between the amounts of isocyanate equivalents, defined as NCO groups, in moles, as compared to hydroxyl (or carboxyl or amine) functional equivalents of the starting polybutadiene or polybutadiene acrylonitrile copolymers. "Stoichiometry" may also be used to refer to the relationship between the amount of amine terminating agent as compared to unreacted isocyanate that is present after the initial reaction step where isocyanate reacts with hydroxyl or carboxyl or amine groups of the starting polybutadiene or polybutadiene acrylonitrile polymers.

Synthesis of the urea-terminated polymers of the invention starts with polymer materials, including but not limited to hydroxyl terminated polybutadiene (HTB), hydroxyl terminated butadiene acrylonitrile copolymers (HTBN), carboxyl terminated polybutadiene (CTB), carboxyl terminated polybutadiene acrylonitrile copolymers (CTBN), amine terminated polybutadiene (ATB) or amine terminated polybutadiene acrylonitrile copolymer (ATBN). The molecular weight of these polymers is usually low, approximately 1,000 to 5,000 Daltons, preferably approximately 3,000 Daltons. This allows for easier handling of both the starting material and finished products, as low molecular weight polymers typically have lower viscosity than higher molecular weight polymers of similar composition. The acrylonitrile content varies and typically ranges between about 0% to about 35%, about 0% to about 26%, about 0.5% to about 26%, about 6% to about 26%, and about 8% to about 22%. By way of example only, commercially available polymers include but are not limited to Hypro® Reactive Liquid Polymers produced by CVC Thermoset Specialties, including Hypro® 2800×95 HTB, 3000×914 HTBN, 2000×162 CTB, 1300×31 CTBN, 1300×8 CTBN,1300×13 CTBN and 1300×45 ATBN. Other similar polymers are available commercially.

In a typical reaction, there are two basic steps. Initially, as a first step, the hydroxyl, carboxyl or amine terminated low molecular weight polymer materials are reacted with an isocyanate, including but not limited to a diisocyanate. Diisocyanates are the most widely used in typical reactions. While not intended to be limiting, the present invention preferably uses 2, 4-toluene diisocyanate (TDI), as it readily reacts with the hydroxyl, carboxyl, or amine groups of the HTB, HTBN, CTB, CTBN, ATB or ATBN selected as the starting material. Other isocyanates commonly used in the industry, which are suitable for use in the present invention, include but are not limited to: 2,6-toluene diisocyanate, combinations of 2,4- and 2,6-diisocyanate, methylene diphenyl diisocyanate (MDI) and polymeric homologs of MDI, hexamethylene diisocyanate (HDI), isophorone diisocyanate, bis(4-isocyanatocyclohexyl) methane and the like. There are many other isocyanates known to those skilled in the art which may be suitable for use in the invention described herein.

The stoichiometry of the initial reaction can be done at a ratio of one polymer functional equivalent (moles of the polymer functional groups reacting with isocyanate groups) to two isocyanate equivalents or can be done with a further excess of isocyanate equivalents. In some cases, use of a further excess of isocyanate equivalents produces a final product of lower viscosity. For preparing the inventive urea-terminated polymers, the stoichiometry ratio (—NCO: -polymer functional group) of the initial reaction ranges between about 10:1 and 4:1.

Optionally, as with the case of the reaction of carboxyl groups and isocyanate, a catalyst may be used to ensure complete reaction. An example of a catalyst for such a reaction is trimethylamine, but other catalysts known to those in the art to be suitable may also be used.

The initial reaction may be done in the presence of an inert solvent, such as xylene, in order to lower the viscosity of the polymer and facilitate the mixing of the polymer and diisocyanate. The solvent should not react with either the diisocyanate or the polymer and should be capable of dissolving both components. Aromatic solvents, such as xylene or toluene, are preferably used, but other suitable solvents are known to one skilled in the art. The reaction is typically performed at elevated temperatures with stirring to ensure reaction between the diisocyanate molecule and the hydroxyl, carboxyl, or amine functional group attached to the polymer chain. A typical reaction temperature is about 70° C., although reaction temperatures may be higher or lower, depending on reactants.

As the second step, an amine terminating agent is added to the mixture resulting from the initial reaction of the hydroxyl, carboxyl or amine functional polymer with diisocyanate. The amine terminating agent reacts with the —NCO (isocyanate) groups on the polymer to produce a terminal urea group. Suitable amine terminating agents can include but are not limited to imidazoles or amines. Suitable amines include but are not limited to primary and secondary amines. A preferred amine is dimethyl amine. Dimethylamine is a gas at room temperature, and therefore most preferably is used in a form that allows for liquid addition of the dimethylamine, such as 11% dimethylamine dissolved in ethanol. The amine terminating agent may also react with any unreacted diisocyanate that is not bound to the polymer to form free urea. Unreacted isocyanate after the addition of the amine terminating agent in the second step is not preferred or required, although depending on the amount of amine terminating agent utilized some unreacted isocyanate may be present. Stoichiometrically, the amine terminating agent may be added in the same, more or less equivalents than the equivalents of unreacted isocyanate left after the initial step.

The second reaction step can be performed at a range of temperatures depending on the heat of reaction between the particular isocyanate and amine terminating agent selected. Generally, the reaction proceeds quickly, and the goal is to control the heat generated by the exotherm. Depending on components selected, exemplary reaction temperature ranges include but are not limited to about −10° C. to about 0° C., about −5° C. to about 10° C., about 5° C. to about 30° C., and about 10° C. to about 75° C. Preferably, the reaction is run at less than 20° C. to control the exotherm, but other temperature ranges would be evident to one skilled in the art.

After the reaction of the amine terminating agent and the isocyanate, the resulting polymer may be heated to an elevated temperature and subjected to reduced pressures to remove the solvent, unreacted dimethylamine, and medium used to dissolve the dimethylamine gas from the reaction mixture, if desired. To the extent there is any unreacted isocyanate, it would remain in the final composition. In certain embodiments, FTIR analysis shows no or substantially no unreacted isocyanate groups remaining in the final reaction product. "Substantially less" means less than about 35% of the starting —NCO equivalents.

Compositions of the inventive urea-terminated polymers differ based on the stoichiometry of components used in the reaction. Differences in stoichiometry affect the amounts of free urea (not bound to the polymer) and unreacted isocyanate, if present, in the inventive urea-terminated polymers. Depending on the stoichiometry selected, amounts of free urea range from about 10% to about 18% by weight of the inventive urea-terminated polymers. Higher free urea content may be achieved depending on reactants and conditions and is considered within the scope of the invention; however, at some point, a limit will be reached where the polymer is not processible. Total urea content of the inventive urea-terminated polymers includes free urea content plus the amount of urea bound to the polymer. The higher the total urea content the faster the acceleration of the curing process.

Stoichiometry also affects the amount of urea-terminated polymer achieved through the reaction. Amounts achieved range from about 30 wt. % to 100 wt. %, preferably about 50 wt. % to 100 wt. %, more preferably about 60 wt. % to 100 wt. %, and most preferably about 70 wt. % to about 98 wt. % of urea-terminated polymer comprising a polymer material selected from any one or more of HTB, HTBN, CTB, CTBN, ATB and ATBN. Amounts of urea terminated polymer achieved affect toughening performance when in use. Typically, in formulating, tougheners are added in amounts of about 15 phr (per 100 parts of epoxy). Hence, at this concentration, if the inventive urea-terminated polymer has a high free urea content, fast acceleration may be achieved, but the lower urea-terminated polymer content will result in little toughening. Hence, stoichiometry is an important consideration for preparing the urea-terminated polymers of the invention to achieve both acceleration and toughening while having little to no effect on glass transition temperature (Tg). These effects are unexpected and unpredictable effects, since it is well known in the art that toughening adversely affects glass transition temperature.

Stoichiometry also has an effect on various properties of formulations in which the inventive compositions are used, such as viscosity of an epoxy adhesive formulation, toughness of an adhesive, and Tg of a cured adhesive.

The urea-terminated polymers of the present invention are incorporated into an epoxy formulation containing dicyandiamide as a curing agent, followed by thermal curing. Dicyandiamide is incorporated into the epoxy formulation at a concentration of, but not limited to, 2 to 8 parts of dicyandiamide to 100 parts of epoxy resin (phr). Dicyandiamide is available in multiple particle sizes, all of which are applicable for use with the present invention. Other curing agents are known to one skilled in the art.

There are many epoxy resins commonly known to those skilled in the art, and the present invention is not limited to the epoxy resins mentioned or utilized herein. By way of a non-limiting example, the diglycidyl ether of bisphenol A can be used.

Without intending to limit the invention, the urea-terminated polymers of the present invention are incorporated into the dicyandiamide containing epoxy formulation at a concentration of 2 to 20 parts of urea-terminated polymer per 100 parts of epoxy resin, preferably at a concentration of 2 to 18 parts or urea-terminated polymer per 100 parts of epoxy resin, more preferably at a concentration of 5 to 18 parts urea-terminated polymer per 100 parts of epoxy resin, and most preferably at a concentration of 10 to 15 parts of urea-terminated polymer per 100 parts of epoxy resin. Depending on the epoxy formulation, amounts may vary slightly as would be evident to one skilled in the art.

The epoxy formulation containing the inventive urea-terminated polymers are then thermally cured. Methods of thermally curing epoxy formulations are known in the art, and the invention is not limited by any particular method.

Optionally, the epoxy formulations of the invention can contain a thixotrope, such as fumed silica, with Cab-O-Sil® TS-720 from Cabot Corporation being one such example. Other thixotropes as well as fillers and extenders commonly known to those in the art, such as tabular alumina, calcium carbonate, barium sulfate, calcium sulfate, and kaolin clay may optionally be included. Suitable additives for epoxy formulations will be known to one skilled in the art.

When the urea-terminated polymers of the invention were incorporated in epoxy formulations, the temperature required to cure the formulations was lowered due to faster acceleration of dicyandiamide curing. Lower cure temperatures are important for industries, such as the automotive industry, where cure may be required at lower temperatures for certain steps in the production process. Alternatively, if it is desirable to maintain cure temperatures at a certain level, use of the inventive urea-terminated polymers reduces curing time significantly. Reducing the curing time at an equivalent curing temperature may also improve productivity in certain processes.

The urea-terminated polymers of the invention also increase the toughness of the cured formulation (epoxy matrix), which can be evaluated by, for example, increases in T-Peel strength, fracture toughness, as well as notched and unnotched impact strength, among other toughness parameters. In addition, the glass transition temperature of the cured epoxy as measured by Differential Scanning calorimetry (DSC) is not significantly reduced. This is important particularly in high temperature applications. The viscosity of the epoxy formulation containing the urea-terminated polymers of the present invention is also lower in comparison to traditional tougheners, and the viscosity of the epoxy formulation increases at a slower or equivalent rate in comparison to that obtained with other commercial available urea accelerators.

Applications for use of the epoxy formulations comprising the inventive urea-terminated polymers include without limitation structural adhesives, foamable structural adhesives, prepreg composites and other one component heat cured composites. Other applications for epoxy formulations comprising the inventive urea-terminated polymers will be evident to one skilled in the art.

EXAMPLES 1-3—Effect of Reaction Stoichiometry

Example 1 demonstrates the synthesis of urea-terminated polymers of the invention using Hypro 3000×914 HTBN (Examples 1 and 2) or Hypro® 2800×95 HTB (Example 3) starting materials using the general method described herein. Table 1 reflects variations in reaction stoichiometry and amounts of starting materials. The inventive urea-terminated polymers were prepared utilizing varying amounts (expressed as equivalents (moles of reactive groups)) of polymer materials, diisocyanate (NCO), and dimethylamine (DMA) as described below.

500 grams of the specified polymer material was weighed into a 3 neck round bottom flask equipped with mechanical stirring and vacuum distillation. The flask was heated in an oil bath to 100° C. with stirring under full vacuum, and allowed to degas for a period of one hour, after which time the temperature was lowered to 45° C. After the oil bath reached 45° C., 300 g of xylene was added, and the reaction mixture was stirred for 20 minutes until homogeneous. After the addition of the xylene, the equivalents of 2,4-toluene diisocyanate specified in Table 1 were added and the reaction was stirred for 20 minutes at 45° C. The reaction temperature was then raised to 70° C. and the reaction was held at that temperature for 4 hours with stirring. After the 4 hours was complete, the reaction temperature was lowered to <25° C. by placing the round bottom three neck flask in an ice bath. The equivalents of 11% dimethylamine in ethanol specified in Table 1 were added dropwise using an addition funnel. The reaction was continued with stirring at a temperature <25° C. for a period of three hours. After the three hours was complete, xylene, ethanol, and any unreacted dimethyl amine were removed under vacuum at 120° C. until visible degassing had ceased. The final product was then removed from the flask and characterized for viscosity using a Brookfield RVT viscometer, number 7 spindle.

The results are shown below in Table 1:

TABLE 1

| | Examples | | |
|---|---|---|---|
| | 1 | 2 | 3 |
| Starting Polymer Material (Hypro ® brand) | 3000 × 914 HTBN | 3000 × 914 HTBN | 2800 × 95 HTB |
| OH Equiv. | 0.345 | 0.345 | 0.205 |
| NCO Equiv. | 1.035 | 1.38 | 0.452 |
| NCO Equiv. left unreacted after reaction with material | 0.69 | 1.035 | 0.247 |
| Moles (Equiv.) DMA | 0.518 | 0.69 | 0.226 |
| Theoretical NCO equivalents unreacted after DMA addition | 0.171 | 0.345 | 0.021 |
| Theoretical weight percentage of urea present in composition not bound to polymer | 11.1 | 14.0 | 9.9 |
| Viscosity @ 27° C. (cP) | 1,376,000 | 640,000 | 1,560,000 |

Inventive Examples 1 through 3 show the effect of reaction stoichiometry on the final product. With a higher excess of isocyanate (—NCO) to hydroxyl groups, the viscosity of the urea terminated product is lower. Examples 1 and 2 show significant differences in viscosity as the stoichiometric ratio of isocyanate (—NCO) to hydroxyl (—OH) was increased. Example 3, which has a different starting material but utilizes a more closely matched stoichiometry (of —NCO to —OH), also reflected higher viscosity. Lower viscosity may be preferred as it allows for easier handling by the formulator. The effect of reaction stoichiometry has not been previously studied, nor has it been utilized in the preparation of urea-terminated polybutadiene or polybutadiene acrylonitrile copolymers in the past.

Performance in Epoxy Adhesives.

The urea-terminated polymers of Examples 2 and 3 were then formulated into a one-part latent heat cured epoxy adhesive as per the formulations listed in Table 2. In certain formulations, amounts of components are expressed in "phr" (parts per 100 parts of epoxy resin). Alternatively, formulation components may be referred to by their equivalents or moles.

Materials Used, Epalloy® 7190 is an epoxy resin and comprises the diglycidyl ether of bisphenol A. Omicure® DDA5 is a dicyandiamide with nominal particle size of 5 microns. Omicure® U24 is a urea accelerator based on 2,4-toluene diisocyanate and dimethylamine used as a control. Cab-O-Sil® TS720 is a fumed silica from Cabot Corporation. Hypro® 1300×63 is the glycidyl ester of Hypro® 1300×13 CTBN and is used as a control for toughening comparison.

All ingredients were mixed at high speed using a high shear mixing blade, and then were degassed under vacuum. The peak exotherm was then measured on a Differential Scanning Calorimeter (DSC) at a heating rate of 10° C./min. Thereafter, all formulations were applied to acetone wiped electrogalvanized steel coupons, 1" by 4", using 10 mil glass beads as spacers, and cured for 30 minutes at 177° C. The adhesives were then tested for T-Peel strength by ASTM D1876 at both room temperature and −40° C., with values in Table 2 reported as an average of 5 test specimens. A small amount of the adhesive, less than 0.5 g, was also spread into a thin film in an aluminum weighing dish and cured for 30 minutes at 177° C. These cured samples were tested for the glass transition temperature, Tg, using a DSC at a heating rate of 10° C./min. Results are shown in Table 2.

Formulations A and B represent experimental controls, wherein formulation A is a control that contains Omicure® U24 as the urea accelerator, but no toughener. Formulation B contains Omicure® U24 as the urea accelerator and with Hypro® 1300×63 as the control toughener. Formulation E represents a formulation containing 15 parts of the inventive urea-terminated polymer of Example 2, which unexpectedly provides both accelerator and toughening to the formulation. The peak exotherm for Formulation E is lower than that measured for Formulation B, and very close to the peak exotherm measured for Formulation A. Lower peak exotherms may provide advantages of lower cure temperatures in some applications.

The room temperature T-Peel of Formulation E is very close to the average value of Formulation B and significantly higher than the average value of Formulation A. The −40° C. T-Peel of Formulation E is not as high as the average value of Formulation B but is still a significant improvement in toughness in comparison to the average value of Formulation A (no toughener).

Surprisingly, it was found that Formulation E gives a glass transition temperature that is very close to Formulation A (no toughener), and significantly increased in comparison to Formulation B (same concentration of traditional toughener with additional accelerator). This was unexpected and unpredictable given that it is well known with polymeric or rubber toughening that increasing the concentration of polymer or rubber comes with a decrease in the glass transition temperature of the cured epoxy. As shown in Table 2, Formulations C through E, increasing the concentration of the Example 2 polymer in the formulation (from 5 parts to 15 parts) increased the glass transition temperature of the formulation, with Formulation E achieving a glass transition temperature very close to Formulation A.

Additional adhesives were prepared as described in the procedure above, stored at ambient temperature and 40° C., and periodically tested for viscosity using a Brookfield RVT viscometer, Spindle #7. The formulations and viscosity data are presented in Table 3. HyPox® RA1340 is an elastomer modified epoxy resin that is the reaction product of 40% by weight Hypro® 1300×13 CTBN and 60% by weight Epalloy® 7190 and is a traditional toughener used in epoxy adhesives.

TABLE 2

| Formulation Components (in parts, phr) | A | B | C | D | E | F | G | H | I | J | K | L | M | N |
|---|---|---|---|---|---|---|---|---|---|---|---|---|---|---|
| Epalloy 7190 | 100 | 100 | 100 | 100 | 100 | 100 | 100 | 100 | 100 | 100 | 100 | 100 | 100 | 100 |
| Hypro ® 1300 × 63 | 0 | 15 | 10 | 5 | 0 | 10 | 5 | 0 | 0 | 0 | 0 | 0 | 0 | 0 |
| Example 2 | 0 | 0 | 5 | 10 | 15 | 0 | 0 | 0 | 2 | 4 | 6 | 0 | 0 | 0 |
| Example 3 | 0 | 0 | 0 | 0 | 0 | 5 | 10 | 15 | 0 | 0 | 0 | 2 | 4 | 6 |
| Ornicure ® DDA5 | 5 | 5 | 5 | 5 | 5 | 5 | 5 | 5 | 5 | 5 | 5 | 5 | 5 | 5 |
| Ornicure ® U24 | 2 | 2 | 0 | 0 | 0 | 0 | 0 | 0 | 0 | 0 | 0 | 0 | 0 | 0 |
| CabOSil TS720 | 3 | 3 | 3 | 3 | 3 | 3 | 3 | 3 | 3 | 3 | 3 | 3 | 3 | 3 |
| Peak Exotherm (° C.) | 150.7 | 154.1 | 162.6 | 155.6 | 152.8 | 170.2 | 160.2 | 155.6 | 172.1 | 163.4 | 159.2 | 176.5 | 166.8 | 161.1 |
| T-Peel @ room temperature (lbf) | 9.0 | 33.6 | 33.0 | 32.5 | 27.6 | 24.8 | 24.0 | 17.9 | 9.7 | 14.9 | 19.2 | 11.0 | 10.1 | 17.2 |
| T-Peel @ −40° C. (lbf) | 8.0 | 31.4 | 29.8 | 17.1 | 15.2 | Not Meas. | Not Meas. | Not Meas. | 6.7 | 7.1 | 8.7 | Not Meas. | Not Meas. | Not Meas. |
| Tg of cured adhesive (° C.) | 140.6 | 125.1 | 119.1 | 131.6 | 138.5 | 108.1 | 122.0 | 139.0 | 108.6 | 122.5 | 129.3 | 116.7 | 122.7 | 125.3 |

TABLE 3

| Formulation components (in parts, phr) | O | P | Q | R | S | T |
|---|---|---|---|---|---|---|
| Epalloy ® 7190 | 100 | 100 | 100 | 77.5 | 77.5 | 77.5 |
| Example 2 | 10 | 15 | 20 | 0 | 0 | 0 |
| HyPox ® RA1340 | 0 | 0 | 0 | 37.5 | 37.5 | 37.5 |
| Omicure ® DDA5 | 5 | 5 | 5 | 5 | 5 | 5 |
| Omicure ® U24 | 0 | 0 | 0 | 1 | 3 | 5 |
| CabOSil TS720 | 3 | 3 | 3 | 3 | 3 | 3 |

| Days | Aging at 40 C. Viscosity @ 27° C. (cP) | | | | | |
|---|---|---|---|---|---|---|
| 0 | 72000 | 82000 | 86000 | 184000 | 200000 | 220000 |
| 2 | 70000 | 84000 | 96000 | 176000 | 204000 | 256000 |
| 4 | 80000 | 92000 | 112000 | 176000 | 210000 | 240000 |
| 7 | Gel | Gel | Gel | 176000 | Gel | Gel |
| 9 | | | | Gel | | |

| Days | Aging at room temperature Viscosity @ 27° C. (cP) | | | | | |
|---|---|---|---|---|---|---|
| 0 | 72000 | 82000 | 86000 | 184000 | 200000 | 220000 |
| 2 | 74000 | 80000 | 88000 | 168000 | 208000 | 208000 |
| 4 | 64000 | 84000 | 84000 | 180000 | 216000 | 260000 |
| 7 | 70000 | 76000 | 80000 | 168000 | 184000 | 200000 |
| 9 | 72000 | 80000 | 88000 | 168000 | 180000 | 220000 |
| 11 | 74000 | 80000 | 84000 | 160000 | 180000 | 204000 |

The results in Table 3 show that the urea-terminated polymers of the invention (Example 2) (Formulations O, P and Q) have similar viscosity increases over time and, hence, provided similar viscosity stability when compared to formulations containing a traditional toughener and the Omicure® U24 urea accelerator (Formulations R, S and T). Omicure® U24 is based on similar chemistry, i.e., the reaction between 2,4-toluene diisocyanate and dimethylamine, but is not a polymeric urea. Surprisingly, it has also been found that use of the inventive urea-terminated polymer of Example 2 as both an accelerator and toughener gave a much lower initial viscosity compared with an adhesive formulation containing a traditional toughener, such as HyPox® RA1340, which may provide significant handling advantages.

EXAMPLES 4-9—Preparations Using Carboxy-Terminated Butadienes

Alternatively, the urea-terminated polymers of the present invention can be made starting with a carboxyl terminated polymer, such as Hypro® CTB or CTBN polymers, commercially available from CVC Thermoset Specialties. The procedure for producing the urea-terminated polymer starting with CTB or CTBN was the same as described for Example 1, with the exception that triethylamine (TEA) was added as the catalyst, and at a weight of 0.2 grams for 100 grams of CTB or CTBN. The TEA was added along with the xylene after the CTB or CTBN was degassed. Table 4 gives the results achieved for the urea-terminated polymers prepared from CTBN.

TABLE 4

| | Formulation Examples | | | | | |
|---|---|---|---|---|---|---|
| | 4 | 5 | 6 | 7 | 8 | 9 |
| Polymer Material | Hypro ® 1300 × 8 CTBN | Hypro ® 1300 × 8 CTBN | Hypro ® 1300 × 8 CTBN | Hypro ® 1300 × 31 CTBN | Hypro ® 1300 × 31 CTBN | Hypro ® 1300 × 31 CTBN |
| COOH Equivalents | 0.054 | 0.054 | 0.054 | 0.051 | 0.051 | 0.051 |
| NCO Equivalents | 0.108 | 0.216 | 0.324 | 0.102 | 0.204 | 0.306 |
| NCO equivalents left unreacted after reaction with polymer material | 0.054 | 0.162 | 0.27 | 0.051 | 0.153 | 0.255 |
| Moles Dimethylamime | 0.054 | 0.108 | 0.162 | 0.051 | 0.102 | 0.153 |
| Theoretical NCO equivalents unreacted after DMA addition | 0 | 0.054 | 0.108 | 0 | 0.051 | 0.102 |
| Theoretical weight percentage of urea present in final composition not bound to polymer material | 0 | 11.5 | 17.3 | 0 | 11.0 | 15.2 |
| Viscosity @ 1 27° C. (cP) | 1,560,000 | 2,000,000 | 720,000 | 656,000 | 1,340,000 | 2,000,000 |

Examples 4 and 7 (Table 4 above) were then formulated into latent heat cured epoxy formulations and tested as per the procedures described above. Table 5 summarizes the components of the epoxy formulations along with the results. Formulation U represents a control with no toughener and 2 phr (parts based on 100 parts of epoxy resin) of traditional urea accelerator, Omicure® U24. Formulation V also represents a control, but with 15 phr of a traditional toughener, Hypox® RA1340, and 2 phr of traditional urea accelerator, Omicure® U24. Formulations W and X contained 15 phr of the inventive polymeric urea accelerator/toughener and no traditional urea accelerator.

TABLE 5

| Components (in parts, phr) | U | V | W | X |
|---|---|---|---|---|
| Epalloy ® 7190 | 100 | 77.5 | 100 | 100 |
| HyPox ® RA1340 | 0 | 37.5 | 0 | 0 |
| Example 4 | 0 | 0 | 15 | 0 |
| Example 7 | 0 | 0 | 0 | 15 |
| Omicure ® DDA5 | 5 | 5 | 5 | 5 |
| Omicure ® U24 | 2 | 2 | 0 | 0 |
| CabOSil TS720 | 3 | 3 | 3 | 3 |
| Peak Exotherm (° C.) | 149.0 | 150.6 | 160.2 | 162.2 |
| T-Peel @ room temperature | 9.8 | 36.2 | 14.8 | 21.7 |
| T-Peel @ −40° C. | 7.6 | 34.6 | 7.3 | 20.4 |
| Tg of cured adhesive (° C.) | 137.0 | 124.8 | Not Meas. | 128.2 |

Results for Formulation X from Table 5 demonstrate that the urea-terminated polymer based on Hypro® 1300×31 CTBN (Example 7), which contained 10% acrylonitrile, achieved significant improvement in T-Peel at room temperature and −40° C. compared to Formulation U with no toughener, but slightly less than Formulation V with HyPox® RA1340 as the control toughener. Formulation X also had a slightly higher Tg than formulation V with HyPox® RA1340 as the control toughener.

The results above demonstrate that urea-terminated polymers of the invention function both as accelerators and tougheners and achieved comparable or better results over traditional tougheners, Unexpectedly, comparable or better toughening of the cured epoxy matrix (epoxy product) was achieved with little to no compromise of the glass transition temperature. In addition, the unexpected accelerator function dispenses with the need to utilize a traditional urea accelerator in epoxy formulations or the need to utilize separate accelerators and tougheners. Lower viscosity and viscosity stability of epoxy formulations are also achieved with the inventive urea-terminated polymers as compared to non-urea-terminated accelerators and tougheners as demonstrated above in Tables 3 and 4.

In accordance with the patent statutes, the best mode and preferred embodiment have been set forth; the scope of the invention is not limited thereto, but rather by the scope of the attached claims.

What is claimed is:

1. A method for preparing a urea-terminated polybutadiene polymer or a urea-terminated polybutadiene acrylonitrile copolymer, comprising:
   a. providing a polybutadiene polymer or polybutadiene acrylonitrile copolymer having at least one of carboxyl or amine functional groups on a terminal end of the polymer;
   b. reacting the carboxyl or amine terminated polybutadiene polymer or polybutadiene acrylonitrile copolymer with 2,4-toluene diisocyanate as an initial step to form a reaction mixture;
   c. adding dimethylamine to the reaction mixture to react with isocyanate groups to form a urea-terminated polybutadiene polymer or polybutadiene acrylonitrile copolymer; and
   d. isolating and collecting the final urea-terminated polybutadiene polymer or polybutadiene acrylonitrile copolymer.

2. The method of claim 1, wherein, in the initial step, the isocyanate is present in stoichiometric excess as compared to the functional groups of the polymer or copolymer, and wherein, in the second step, the isocyanate groups are present, stoichiometrically, in the same or lower equivalents as compared to the dimethylamine.

3. The method of claim 2, wherein, in the initial step, the ratio of isocyanate groups to the functional groups of the polymer or copolymer ranges between about 10:1 to about 4:1.

4. The method of claim 1, wherein the final urea-terminated polybutadiene polymer or urea-terminated polybutadiene acrylonitrile copolymer contains substantially no unreacted isocyanate groups.

5. An epoxy formulation comprising:
   a. an epoxy resin;
   b. a curing agent; and
   c. a compound that functions as both an accelerator and toughener comprising a urea-terminated polybutadiene polymer or urea-terminated polybutadiene acrylonitrile copolymer, wherein the compound is prepared by a method, comprising:
      providing a polybutadiene polymer or polybutadiene acrylonitrile copolymer having at least one of carboxyl or amine functional groups on a terminal end of the polymer;
      reacting the carboxyl or amine terminated polybutadiene polymer or polybutadiene acrylonitrile copolymer with an isocyanate as an initial step to form a reaction mixture;
      adding an amine terminating agent to the reaction mixture to react with isocyanate groups to form a urea-terminated polybutadiene polymer or polybutadiene acrylonitrile copolymer; and
      isolating and collecting the final urea-terminated polybutadiene polymer or polybutadiene acrylonitrile copolymer.

6. The epoxy formulations claim 5, wherein the curing agent is dicyandiamide.

7. A method of toughening epoxy products, comprising, prior to curing, adding an epoxy formulation to a urea-terminated polybutadiene polymer or urea-terminated polybutadiene acrylonitrile copolymer, wherein the copolymer is prepared by a method comprising,
   providing a polybutadiene polymer or polybutadiene acrylonitrile copolymer having at least one of carboxyl or amine functional groups on a terminal end of the polymer;
   reacting the carboxyl or amine terminated polybutadiene polymer or polybutadiene acrylonitrile copolymer with an isocyanate as an initial step to form a reaction mixture;
   adding an amine terminating agent to the reaction mixture to react with isocyanate groups to form a urea-terminated polybutadiene polymer or polybutadiene acrylonitrile copolymer; and
   isolating and collecting the final urea-terminated polybutadiene polymer or polybutadiene acrylonitrile copolymer.

* * * * *